US012657467B2

(12) United States Patent
Baek et al.

(10) Patent No.: US 12,657,467 B2
(45) Date of Patent: Jun. 16, 2026

(54) METHOD OF SLICING DEEP LEARNING MODEL FOR HETEROGENEOUS EMBEDDED SYSTEM AND INFERENCING METHOD BASED ON SLICED DEEP LEARNING MODEL IN HETEROGENEOUS EMBEDDED SYSTEM

(71) Applicant: UNIST (ULSAN NATIONAL INSTITUTE OF SCIENCE AND TECHNOLOGY), Ulsan (KR)

(72) Inventors: Woongki Baek, Ulsan (KR); Myeonggyun Han, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 716 days.

(21) Appl. No.: 17/988,322

(22) Filed: Nov. 16, 2022

(65) Prior Publication Data

US 2023/0206074 A1      Jun. 29, 2023

(30) Foreign Application Priority Data

Dec. 27, 2021    (KR) ......................... 10-2021-0188642

(51) Int. Cl.
  *G06N 3/082*      (2023.01)
  *G06F 11/30*      (2006.01)
  *G06N 3/092*      (2023.01)
(52) U.S. Cl.
  CPC ......... *G06N 3/082* (2013.01); *G06F 11/3062* (2013.01); *G06N 3/092* (2023.01)
(58) Field of Classification Search
  CPC .............................. G06N 3/082; G06N 3/092
  See application file for complete search history.

(56) References Cited

U.S. PATENT DOCUMENTS

2020/0175361 A1 *  6/2020  Che ........................... G06N 3/08
2021/0081773 A1 *  3/2021  Chawla ................. G06F 1/3228

FOREIGN PATENT DOCUMENTS

KR      10-2029711 A    10/2019
KR      10-2257028 A    5/2021

OTHER PUBLICATIONS

Gao, Yuanxiang, Li Chen, and Baochun Li. "Spotlight: Optimizing device placement for training deep neural networks." International Conference on Machine Learning. PMLR, 2018. (Year: 2018).*

(Continued)

*Primary Examiner* — Eric Nilsson
(74) *Attorney, Agent, or Firm* — Tarolli, Sundheim, Covell & Tummino LLP

(57) ABSTRACT

A method of slicing a deep learning model for a heterogeneous embedded system includes collecting, by a model slicing apparatus, an execution time and power consumption when each layer corresponding to one layer of a deep learning model including a plurality of layers is executed in each computing device of the heterogeneous embedded system, predicting, by the model slicing apparatus, a performance cost and a power cost when each of the layers is executed in each of the computing devices using the execution time and the power consumption, predicting, by the model slicing apparatus, a communication cost when transmitting information from each of the layers to a next layer in each of the computing devices, and slicing, by the model slicing apparatus, the plurality of layers so that different sliced layers are allocated to each of the computing devices based on the performance cost, the power cost, and the communication cost in a given execution time limit condition using a reinforcement learning model.

12 Claims, 5 Drawing Sheets

(56) References Cited

OTHER PUBLICATIONS

Applicant: Ulsan National Institute of Science and Technology; Korean Application No. 10-2021-0188642, filed: Dec. 27, 2021; Korean Office Action dated Feb. 5, 2025; 8 pgs.

Myeonggyun Han et al., Title: "MOSAIC: Heterogeneity-, Communication-, and Constraint-Aware Model Slicing and Execution for Accurate and Efficient Inference"; 2019 28th International Conference on Parallel Architectures and Compilation Techniques (PACT); 13 pgs.; DOI:10.1109/PACT.2019.00021.

Myeonggyun Han et al., Title: "HERTI: a Reinforcement Learning-Augmented System for Efficient Real-Time Inference on Heterogeneous Embedded Systems" 2021 30th International Conference on Parallel Architectures and Compilation Techniques (PACT); 13 pgs.; DOI: 10.1109/PACT52795.2021.00014.

* cited by examiner

METHOD OF SLICING DEEP LEARNING MODEL FOR HETEROGENEOUS EMBEDDED SYSTEM AND INFERENCING METHOD BASED ON SLICED DEEP LEARNING MODEL IN HETEROGENEOUS EMBEDDED SYSTEM

CROSS-REFERENCE TO RELATED APPLICATION

This application claims the benefit under 35 U.S.C. § 119(a) of Korean Patent Application No. 10-2021-0188642, filed on Dec. 27, 2021, in the Korean Intellectual Property Office, the entire disclosure of which is incorporated herein by reference for all purposes.

BACKGROUND

Field

The following description relates to a technique of slicing a deep learning model for a heterogeneous embedded system and a technique of inferring the sliced deep learning model.

Discussion of Related Art

Real-time deep learning inference is required in various intelligent services such as autonomous driving, interactive video production, and augmented reality. A single system that does not use a cloud may have difficulty in real-time processing of a relatively large amount of data such as video data. Accordingly, heterogeneous embedded systems are attracting attention in the real-time inference field. A heterogeneous embedded system includes various computing devices such as big core clusters, little core clusters, graphics processing units (GPUs), and neural processing units (NPUs). These computing devices have different structures and system characteristics in criteria such as performance, power consumption, functions, memory capacity, and communication loads.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of slicing a deep learning model for a heterogeneous embedded system includes collecting, by a model slicing apparatus, an execution time and power consumption when each layer corresponding to one layer of a deep learning model including a plurality of layers is executed in each computing device of the heterogeneous embedded system, predicting, by the model slicing apparatus, a performance cost and a power cost when each of the layers is executed in each of the computing devices using the execution time and the power consumption, predicting, by the model slicing apparatus, a communication cost when transmitting information from each of the layers to a next layer in each of the computing devices, and slicing, by the model slicing apparatus, the plurality of layers so that different sliced layers are allocated to each of the computing devices based on the performance cost, the power cost, and the communication cost in a given execution time limit condition using a reinforcement learning model.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The technology to be described below is a technique of providing real-time deep learning inference in a heterogeneous embedded system. The technology to be described below is a technique of allocating a task of a deep learning model to computing devices of a heterogeneous embedded system on the premise of the deep learning model prepared in advance.

The deep learning model includes a plurality of layers. The following technology uniformly slices layers of the deep learning model, and allocates the sliced layer(s) to each computing device. Hereinafter, an operation of slicing the deep learning model into certain layer(s) is called slicing or model slicing.

The following example is a technique of slicing a deep learning model so that each computing device may distribute and perform deep learning inference in a heterogeneous embedded system. Of course, the technology to be described below may include a process of performing real-time deep learning inference using the sliced deep learning model.

Figure 1:
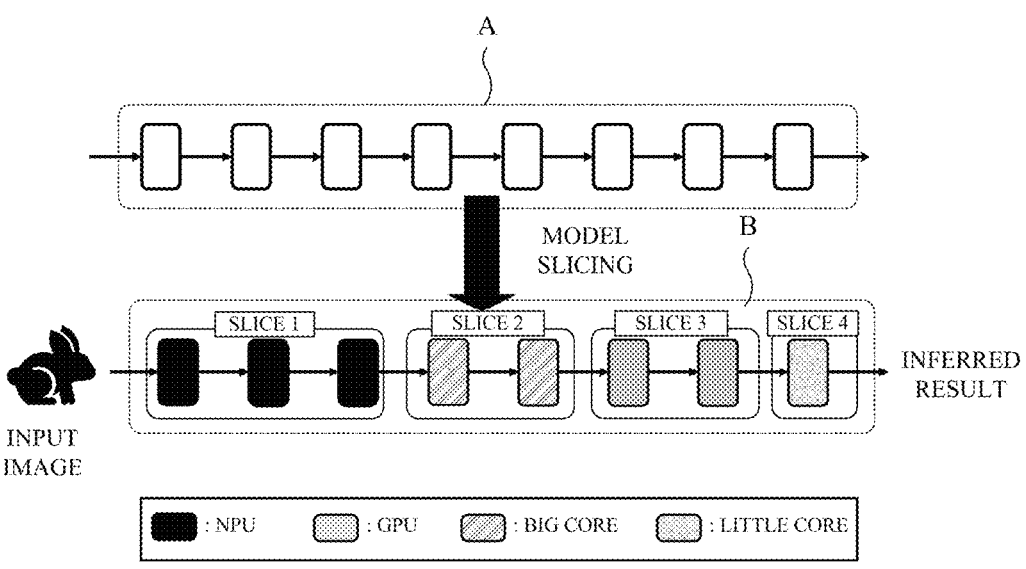
FIG. 1 is an example of a process of inferring a deep learning model sliced in a heterogeneous embedded system.

FIG. 1 is an example of a process of inferring a deep learning model sliced in a heterogeneous embedded system. In FIG. 1A shows a trained deep learning model. FIG. 1 is an example in which a specific heterogeneous embedded system infers an input image using a corresponding deep learning model. It is assumed that the heterogeneous embedded system consists of various computing devices. And the computing devices includes a neural processing unit (NPU), a graphics processing unit (GPU), a big core, and a little core. In FIG. 1B shows a deep learning model which is sliced with the heterogeneous embedded system. Referring to FIG. 1B, the deep learning layers are sliced and allocated to the NPU, the GPU, the big core, and the little core, respectively.

In FIG. 1, a slice indicates one unit which is sliced from the deep learning model and processed by one computing device. The one unit includes at least one layer of the deep learning model. In FIG. 1, the NPU is responsible for slice 1, the GPU is responsible for slice 3, the big core is responsible for slice 2, and finally, the little core is responsible for slice 4.

The heterogeneous embedded system inputs an input image to a deep learning model to infer an image. The heterogeneous embedded system processes slices, which each computing device is responsible for, according to previously allocated information, and transfers results processed in one slice to a next slice for processing.

The technology to be described below slices a deep learning model based on reinforcement learning (RL). The technology to be described below is to slice and allocate a deep learning model to a plurality of computing devices using information on the deep learning model and information on computing devices of a heterogeneous embedded system.

Meanwhile, model slicing may be performed in the heterogeneous embedded system. Furthermore, the model slicing may also be performed in the computing device other than the heterogeneous embedded system. Hereinafter, it will be described that a model slicing apparatus performs the model slicing. The model slicing apparatus may be a heterogeneous embedded system, a separate computer device, a server, or the like.

Figure 2:
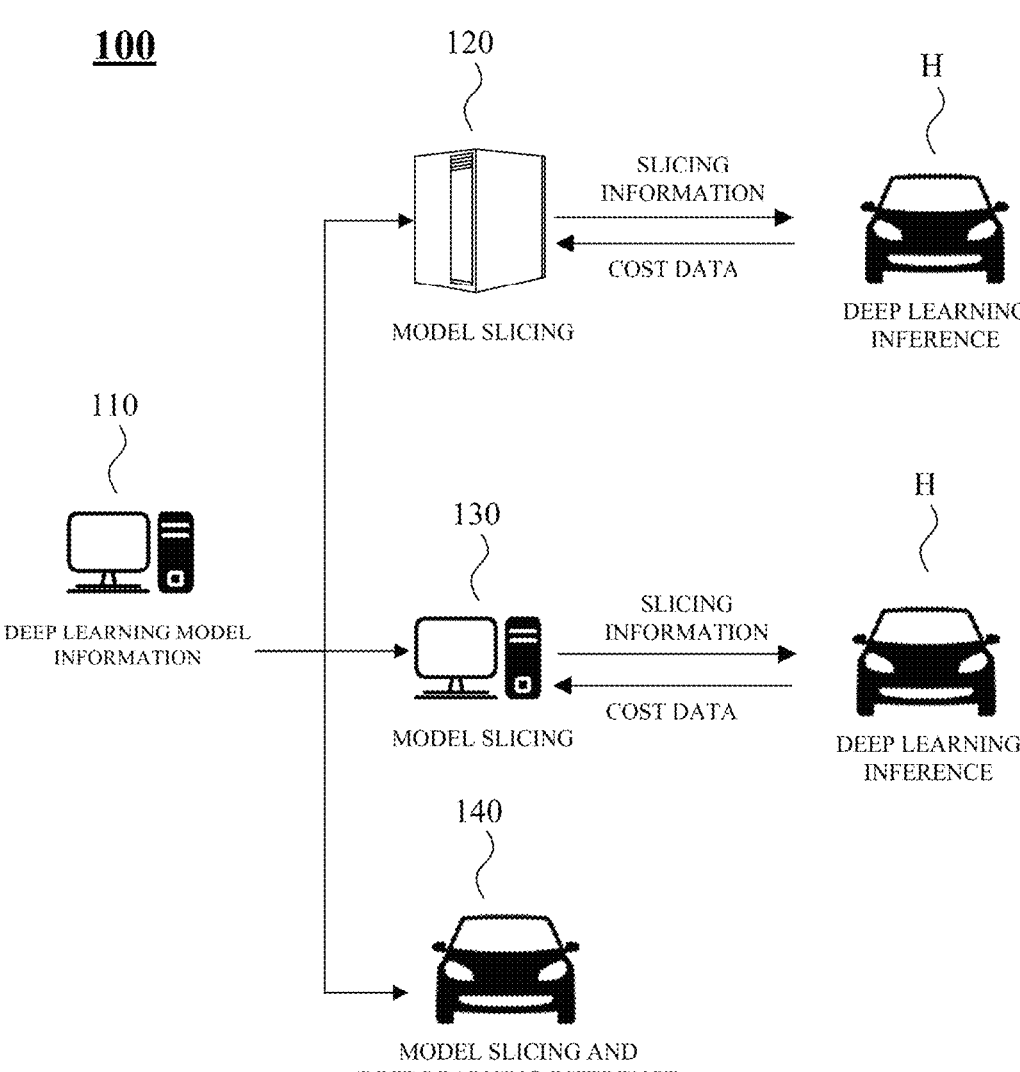
FIG. 2 is an example of a system for slicing a deep learning model.

FIG. 2 is an example of a system 100 for slicing a deep learning model. In FIG. 1, a model slicing apparatus is illustrated as a server 120, a computer device 130 such as a personal computer (PC), or a vehicle 140 corresponding to a heterogeneous embedded system by way of example. A terminal 110 may transmit information on a deep learning model, which is a model slicing target, to the model slicing apparatus. The information on the deep learning model may include a layer structure of a model, constraints (memory usage) required for inference, communication overhead (size of a tensor) between each layer, and the like. Furthermore, the terminal 110 may further transfer a time limit condition corresponding to a real-time condition for inference to the model slicing apparatus.

The server 120 requires information on a deep learning model and information on a heterogeneous embedded system in which the deep learning model operates. The information on the heterogeneous embedded system may include various computing devices included in the heterogeneous embedded system, constraints (memory usage, power consumption, etc.) of each computing device. The server 120 may receive the information on the heterogeneous embedded system from the heterogeneous embedded system (vehicle H). In some cases, the server 120 may receive the information on the heterogeneous embedded system from the terminal 110. The server 120 slices a model based on the information on the deep learning model and the information on the heterogeneous embedded system. In this process, the server 120 may receive cost data required to perform an operation of a specific layer(s) in a specific computing device of the heterogeneous embedded system. The details of the model slicing process will be described later. The server 120 may finally transmit slicing information for slicing and allocating the corresponding deep learning model to each computing device of the heterogeneous embedded system to the heterogeneous embedded system. Thereafter, the heterogeneous embedded system II may allocate a sliced deep learning model to each computing device based on the slicing information to perform inference.

The computer device 130 requires the information on the deep learning model and the information on the heterogeneous embedded system in which the deep learning model operates. The information on the heterogeneous embedded system may include various computing devices included in the heterogeneous embedded system, constraints (memory usage, power consumption, etc.) of each computing device. The computer device 130 may receive the information on the heterogeneous embedded system from the heterogeneous embedded system (vehicle H). In some cases, the computer device 130 may receive the information on the heterogeneous embedded system from the terminal 110. The computer device 130 slices a model based on the information on the deep learning model and the information on the heterogeneous embedded system that are provided. In this process, the computer device 130 may receive cost data required to perform an operation of a specific layer(s) in a specific computing device of the heterogeneous embedded system. FIG. 2 illustrates the terminal 110 and the computer device 130 as separate objects, but the terminal 110 and the computer device 130 may be physically the same device. The details of the model slicing process will be described later. The computing device 130 may finally transmit slicing information for slicing and allocating the corresponding deep learning model to each computing device of the heterogeneous embedded system to the heterogeneous embedded system. Thereafter, the heterogeneous embedded system H may allocate a sliced deep learning model to each computing device based on the slicing information to perform inference.

The vehicle 140 requires information on a deep learning model and information on a heterogeneous embedded system in which the deep learning model operates. The information on the heterogeneous embedded system may include various computing devices included in the heterogeneous embedded system, constraints (memory usage, power consumption, etc.) of each computing device. The vehicle 140 slices a model based on the information on the deep learning model and the information on the heterogeneous embedded system. In this process, the vehicle 140 may confirm cost data required to perform an operation of a specific layer(s) in a specific computing device of the heterogeneous embedded system. The details of the model slicing process will be described later. The vehicle 140 may finally generate slicing information for slicing and allocating the corresponding deep learning model to each computing device of the heterogeneous embedded system. Thereafter, the vehicle 140 may allocate a sliced deep learning model to each computing device based on the slicing information to perform inference.

The model slicing apparatus performs model slicing. The model slicing apparatus corresponds to a software-based system that performs the model slicing. That is, the model slicing apparatus performs the model slicing using a program and a learning model that constantly processes the input deep learning model. The model slicing apparatus slices a specific deep learning model based on a specific heterogeneous embedded system. Hereinafter, the deep learning model to be sliced is called a target deep learning model. In addition, the heterogeneous embedded system in which the target deep learning model operates is called a target heterogeneous embedded system.

Figure 3:
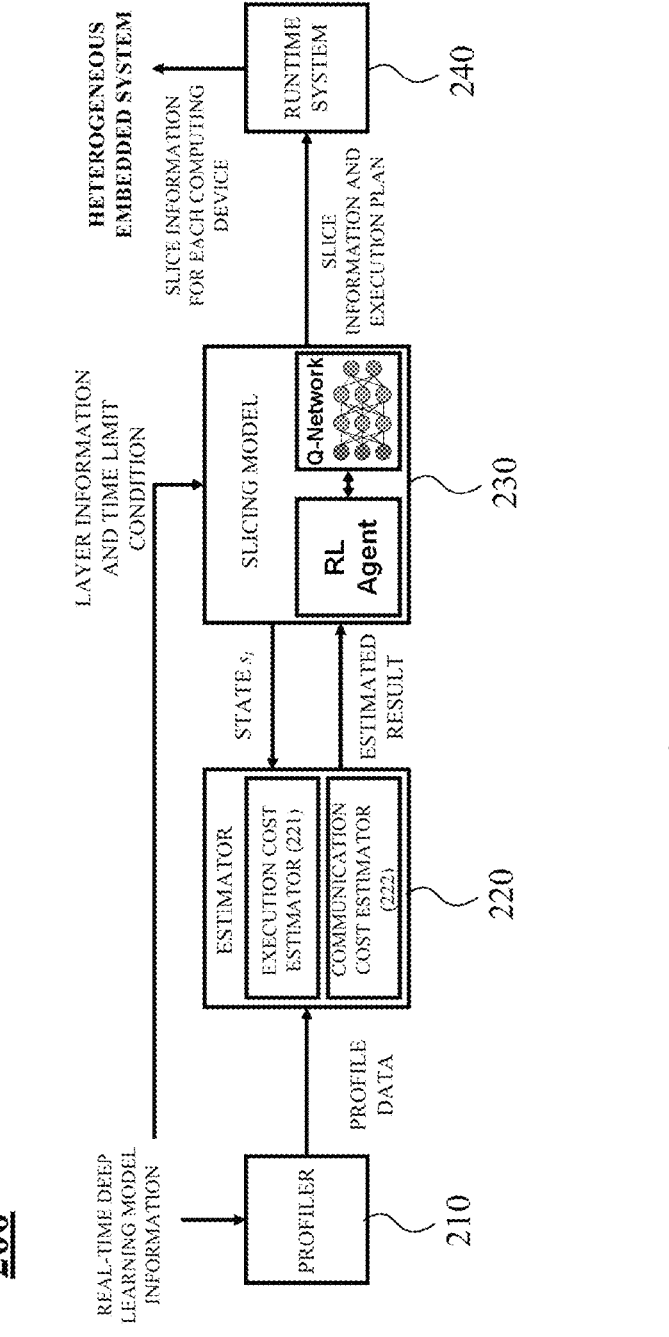
FIG. 3 is an example of an architecture of software for slicing a model.

FIG. 3 is an example of an architecture of software 200 for slicing a model. The model slicing software includes a profiler 210, an estimator 220, a slicing model 230, and a runtime system 240.

The profiler 210 receives information (structure information) on the target deep learning model. The profiler 210 collects cost data required for executing an operation of each layer of the target deep learning model in the computing device in the target heterogeneous embedded system. The profiler 210 collects cost data required for each layer of the target deep learning model during the inference process in the target heterogeneous embedded system.

The profiler 210 may calculate the cost data required for each layer by using information on computing power of the computing device and information on the layer of the deep learning model. The cost data includes an execution time, power consumption (energy consumption), and the like. Accordingly, the profiler 210 collects cost data required when a specific layer of the target deep learning model operates on a specific computing device of the target heterogeneous embedded system. As a result, the profiler 210 may collect cost data for all possible combinations of all layers of the target deep learning model and computing devices of the target heterogeneous embedded system.

When at least one of the computing devices supports dynamic voltage and frequency scaling (DVFS), the profiler 210 collects cost data at minimum and maximum frequencies possible for each layer.

When it is impossible to collect cost data from a specific computing device for a certain layer due to memory or functional limitations, the profiler 210 sets the cost for the corresponding layer to infinity in the corresponding computing device.

The profiler 210 also collects a size of an input tensor size and a size of an output tensor of each layer. The size of the tensor is used to estimate the communication cost in the corresponding layer.

The profiler 210 collects the cost data and the size of the tensor required for each of the computing devices of the target heterogeneous embedded system to perform the inference process of each layer of the target deep learning model. The entire data collected by the profiler 210 is collectively referred to as profile data. The profile data may be composed of information for each layer.

The estimator 220 receives the profile data. The estimator 220 includes an execution cost estimator 221 and a communication cost estimator 222. The cost at each layer includes an execution cost and communication cost.

The communication cost corresponds to the cost of transmitting certain information from a sliced layer (slice) to a next slice. Researchers performed microbenchmarking on tensors having various sizes, and as a result, it was confirmed that the communication cost has a constant linear relationship with the size of the tensor. According to these results, researchers estimated the communication cost using the size of the input tensor and the size of the output tensor of specific layer 1. The communication cost estimator 222 may estimate the communication cost of layer 1 with the correlation shown in Equations 1 and 2 below. Equation 1 is the cost at an input end of layer 1, and Equation 2 is the cost at an output end of layer 1.

$$C_{i,l,d,f_d} = \beta_{d,f_d} \cdot \tau_{i,l} + \delta_{d,f_d} \qquad \text{[Equation 1]}$$

$$C_{o,l,d,f_d} = \beta_{d,f_d} \cdot \tau_{o,l} + \delta_{d,f_d} \qquad \text{[Equation 2]}$$

$\tau_{i,1}$ denotes a total size of an input tensor in layer 1, $\tau_{o,1}$ denotes a total size of an output tensor in layer 1, $\beta_{d,f_d}$ denotes a regression coefficient for computing device d at frequency $f_d$, and $\delta_{d,f_d}$ corresponds to a constant value (adjustment value) for the computing device d at frequency $f_d$.

The execution cost estimator 221 excludes the communication cost and estimates the execution cost required to perform an inference operation of each layer in each computing device. The execution cost estimator 221 first estimates the total execution cost of the computing device d operating at the frequency $f_d$ using the profile data. The execution cost estimator 221 estimates the execution cost required when the computing device d operates at the maximum frequency and the minimum frequency. Thereafter, the execution cost estimator 221 estimates the execution cost by subtracting the communication cost estimated by the communication cost estimator 222 from the total execution cost for each layer.

The execution cost estimator 221 predicts performance and power, respectively.

The execution cost estimator 221 may predict performance based on a linear model as shown in Equation 3 below. The performance may be determined using the time required for a specific computing device to perform inference of a specific layer.

$$T_{l,d,f_d} = \theta_{l,d} \cdot \frac{1}{f_d} + \rho_{l,d} \qquad \text{[Equation 3]}$$

$T_{l,d,f_d}$ denotes the estimated latency in the inference of the layer 1 of the computing device d at frequency $f_d$, and $\theta_{l,d}$ and $\rho_{l,d}$ denote coefficients. $\theta_{l,d}$ and $\rho_{l,d}$ may be determined by calculating a slope and an intercept of a linear expression connecting two points using data collected by the profiler 210 at the maximum frequency and the minimum frequency.

The execution cost estimator 221 may predict the power required for the inference of the layer 1 of the computing device d at the frequency $f_d$ using Equation 4 below. The total power consumption may be divided into dynamic power consumption $P_{dynamic,l,d,fd}$ and static power consumption $P_{static,l,d,fd}$.

$$P_{l,d,f_d} = P_{dynamic,l,d,f_d} + P_{static,d,f_d} \qquad \text{[Equation 4]}$$

The static power consumption is determined according to unique characteristics of the computing device. The static power consumption is determined regardless of the characteristics of the deep learning model, and thus, may be determined only with given information (offline profile) without executing a specific layer.

On the other hand, the dynamic power consumption may be determined according to characteristics of the computing device and characteristics of the layer. The execution cost estimator 221 may predict the power required for the inference of the layer 1 of the computing device d at the frequency $f_d$ using Equation 5 below.

$$P_{dynamic,l,d,f_d} = \frac{V_{f_d}^2 \cdot f_d}{V_{f_d,max}^2} \cdot P_{dynamic,l,d,f_{d,max}} \qquad \text{[Equation 5]}$$

$f_{d,max}$ denotes the maximum frequency of the computing device d, and $V_{f_d,max}$ denotes a voltage level at $f_{d,max}$. A voltage level may be obtained from hardware specifications or measurements. $P_{dynamic,l,d,f_d}$ eventually denotes the dynamic power consumption value at the maximum frequency.

The slicing model 230 slices the deep learning model to maximize execution efficiency such as energy efficiency while satisfying the given real-time condition as the reinforcement learning model. The slicing model 230 calculates the above-described slicing information. The slicing information includes the number of slices configured by slicing the deep learning model, the layer(s) belonging to each slice, and the information on the computing device executing each slice. The slicing information may further include execution frequency information of each computing device.

Figure 4:
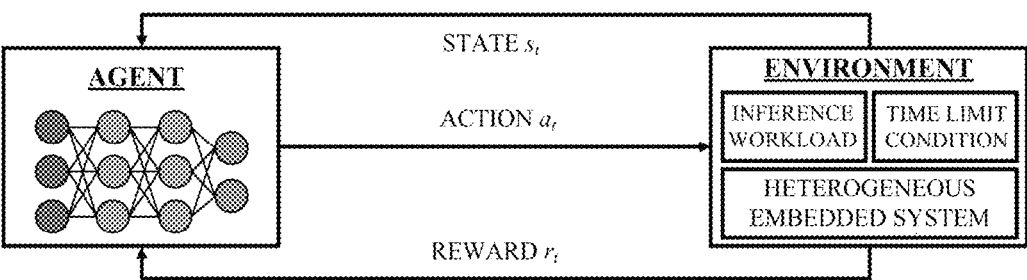
FIG. 4 is an example of a reinforcement learning model for calculating slicing information.

The slicing model 230 may be implemented in various forms among reinforcement learning models. Researchers used a deep Q network (DQN)-based model considering the memory usage of the model, the time required for learning, and the like. FIG. 4 is an example of a reinforcement learning model for calculating slicing information. The reinforcement learning model largely includes an agent and an environment.

The environment includes information on an inference workload, the time limit condition, and the heterogenous embedded system. The inference workload is information on the structure and performance of the deep learning model, and may include layer information, communication overhead, constraints (memory requirements, etc.), energy consumption, etc.

An agent corresponds to the slicing model 230, and receives state $s_t$ and reward $r_t$ at time (operation) t to determine a certain action $a_t$ in the DQN structure.

The state $s_t$ may be expressed as in Equation 6 below. The state is expressed as a vector having a length equal to the number of layers $\Lambda$.

$$s_t = (\vec{e}_1, \vec{e}_2, \dots, \vec{e}_\Lambda) \qquad \text{[Equation 6]}$$

Each element of a state vector is also a vector, and the element is expressed as in Equation 7 below. In Equation 7, 1 denotes an index of the layer. $\sigma \in \{0,1\}$ denotes whether the corresponding layer is a first layer of a specific slice ($\sigma=1$) or not ($\sigma=0$). $d \in D$ denotes the specific computing device executing the corresponding layer operation. In the heterogenous embedded system, a computing device set D may be {big core, little core, GPU, NPU}. Of course, this is an example, and D may include various other computing devices. $f_d \in F_d$ denotes the frequency of the computing device d, and $f_d$ denotes possible frequencies of d.

$$\vec{e}_1 = (\sigma, d, f_d) \qquad \text{[Equation 7]}$$

At each operation t, an agent interacts with the environment by delivering certain actions (inference workload in the target heterogeneous embedded system) to the environment. Agents are designed to perform actions by selecting a single layer rather than multiple layers. This allows a state space to be searched progressively. Equation 8 below represents an action performed by an agent in operation t.

$$a_t = (l, k) \qquad \text{[Equation 8]}$$

l denotes a layer index to perform the corresponding action, and $k \in$ means a change related to the corresponding action. For each layer, the agent may apply any one of the changes defined in Equation 9 below. The defined changes include creating a new slice ($k_{split}$) from the corresponding layer, merging ($k_{merge}$) a slice to which the corresponding layer belongs and a previous slice, changing a computing device (next device $k_{d,next}$ or previous device $k_{d,prev}$ in a computing device list) executing the corresponding layer, increasing a frequency $k_{fd,up}$ by one level of the computing device, and decreasing a frequency $k_{fd,down}$ by one level of the computing device. Accordingly, the agent may output an action indicating a change in any of the above changes for the current layer.

$$K = \{k_{split}, k_{merge}, k_{d,next}, k_{d,prev}, k_{f_d,up}, k_{f_d,down}\} \qquad \text{[Equation 9]}$$

The slicing model 230 uses the DQN to establish a model slicing and inference execution plan (generation of slicing information). The DQN may include all-connected layers and ReLU functions. An algorithm in Table 1 below is an example of the model slicing and inference execution plan establishment using the DQN.

TABLE 1

| Algorithm 1 The findEfficientSlicingAndExecPlan function |
|---|
| 1:      procedure FINDEFFICIENTSLICINGANDEXECPLAN(/\) |
| 2:      \|   Q ← initializeQNetwork(A, depth, width) |
| 3:      \|   $M_r$ ← initializeReplayMemory( ) |
| 4:      \|   $s_1$ ← $s_{init}$ |
| 5:      \|   $s_{best}$ ← $s_{init}$ |
| 6:      \|   $T_{best}$ ← −Φ |
| 7:      \|   for t ← 1 to $t_{max}$ do |
| 8:      \|   \|   $A_t$ ← getValidActions($s_t$) |
| 9:      \|   \|   if generateRandomNumber( ) < ε(t) then |
| 10:     \|   \|   \|   $\alpha_t$ ← getRandomAction($A_t$) |
| 11:     \|   \|   else |
| 12:     \|   \|   \|   $\alpha_t$ ← argmax$_{a \in A_t}$Q($s_t$, α) |
| 13:     \|   \|   end if |
| 14:     \|   \|   $r_t$ ← calculateImmediateReward($s_t$, $a_t$) |
| 15:     \|   \|   $s_{t+1}$ ← applyAction($s_t$, $a_t$) |

TABLE 1-continued

Algorithm 1 The findEfficientSlicingAndExecPlan function

```
16:    |  |  if r_t > r_best then
17:    |  |  |  r_best ← r_t
18:    |  |  |  s_best ← s_{t+1}
19:    |  |  end if
20:    |  |  M_t ← M_t ∪ {(s_t, α_t, r_t, s_{t+1})}
21:    |  |  B ← sampleMiniBatch(M_t)
22:    |  |  trainAndUpdateQNetwork(Q, B, t)
23:    |  end for
24:    |  return s_best
25:    end procedure
```

Referring to Algorithm 1, main variables are initialized (lines 2 to 6), and the slicing model 230 repeats processes of lines 7 to 23 to learn the DQN model. Physically, the learning process is performed by the above-described model slicing apparatus. The learning process is described based on operation t. An agent may select an action based on his/her learning level. To prevent local convergence, an agent may randomly select a possible action with probability $\varepsilon(t)$ (line 10). The agent may select an optimal action $a_t$ at the time based on $1-\varepsilon(t)$ probability calculated by an Q network operation. As t increases, $\varepsilon(t)$ decreases to select an action according to the trained Q network.

The slicing model 230 calculates the reward $r_t$ in consideration of a state transition according to a given action. The reward may be calculated through an algorithm (calculateImmediateReward function, hereinafter reward function) in Table 2 below. The reward function uses the execution cost and communication cost estimated by the estimator (lines 3 to 11).

TABLE 2

Algorithm 2 The calculateImmediateReward function

```
1:     procedure CALCULATEIMMEDIATEREWARD(s, a)
2:     |  s' ← applyAction(s, a)
3:     |  C_s' ← estimateCommunicationCost(s')
4:     |  T_s' ← estimatePerformance(s')
5:     |  P_s' ← estimatePowerConsumption(s')
6:     |  Γ_s' ← calculateCost(C_s', T_s', P_s')
7:     |  if T_s' ≤ T_deadline then
8:     |  |  r_s' ← -√Γ_s'
9:     |  else
10:    |  |  r_s' ← -Ψ
11:    |  end if
12:    |  return r_s'
13:    end procedure
```

Equation 10 below corresponds to an equation for calculating the reward.

$$r_s = \begin{cases} -\sqrt{T_s} & \text{if } T_s \leq T_{deadline} \\ -\Phi & \text{otherwise} \end{cases}$$ [Equation 10]

$\Gamma_s$ denotes energy consumption, an energy-delay product (EDP), etc., as the total cost (determined based on power cost, performance (latency) cost, and communication cost) in state s, and $\Phi$ denotes a penalty. The penalty may be set to 100 when the time limit condition is not satisfied. When a time limit condition for target inference is satisfied in the state s, the reward may be set to $-_y\Gamma_s$. That is, the reward increases as the cost decreases. On the other hand, when the time limit condition is not satisfied, the corresponding state is excluded.

The slicing model 230 determines and stores another operation state $s_{t+1}$ when the current reward is higher than the previously identified highest reward. The slicing model 230 writes $s_t$, $a_t$, $r_t$, and $s_{t+1}$ to a memory.

Thereafter, the slicing model 230 randomly selects samples stored in the memory to generate a training data batch, and trains the Q network using the selected training data batch. The Q network trained through this process allows an agent to select a more effective action. The slicing model 230 repeats this process a certain number of times to calculate the optimal state $s_{best}$ having the highest reward. The state includes slices of a particular deep learning model, a computing device executing each slice, and a frequency of each computing device.

In FIG. 3, the runtime system 240 may execute the corresponding deep learning model in the target heterogeneous embedded system environment based on the state (=slicing information) finally calculated by the slicing model 230.

Researchers configured the heterogeneous embedded system environment and verified whether various deep learning models operate properly. Researchers configured the heterogeneous embedded system using the HiKey 970 development board. The system is a system that is equipped with a Kirin 970 mobile processor including a CPU with 4 big cores and 4 little cores, a Mali-G72 GPU and an NPU. Table 3 below is information on the heterogeneous embedded system configured for verification.

TABLE 3

| Device | Voltage and frequency levels (V, MHz) |
|---|---|
| Big core cluster | (0.7, 682), (0.8, 1018), (0.8, 1210), (0.8, 1364), (0.9, 1498), (0.9, 1652), (0.9, 1863), (1.0, 2093), (1.1, 2362) |
| Little core cluster | (0.7, 509), (0.8, 1018), (0.9, 1210), (0.9, 1402), (1.0, 1556), (1.0, 1690), (1.1, 1844) |
| GPU | (0.6, 104), (0.7, 151), (0.7, 237), (0.7, 332), (0.8, 415), (0.8, 550), (0.9, 667), (1.0, 767) |

The NPU does not execute slices larger than 100 MB due to memory limitations. Although the memory limitations of the big core, the little core, and the GPU are not known, the inference was performed without memory shortage during the actual inference process, and it was assumed that the corresponding computing devices do not have memory constraints.

The heterogeneous embedded system used Android 8.1 as an operating OS, and the inference model was implemented with TensorFlow Lite 1.11.0.

In such a verification system environment, researchers performed the model slicing and inference on the inference models shown in Table 4 below. Inception V4 (IN), MnasNet (width parameters, pW=1.0, MN−1.0) and MnasNet (pW=1.3, MN−1.3), MobileNet V2 (pW=1.3, MO−1.3), MobileNet V2 (pW=1.4, MO−1.4), ResNet V2 (RN) and VGG (VGG) were used. As a result of the experiment, there were some deviations between the models, but it showed significant accuracy. Researchers used inference models showing various characteristics in terms of memory usage and number of layers.

TABLE 4

| Workload | Accuracy (%) | Size (MB) | Layers | Short/medium/long deadlines in milliseconds |
|---|---|---|---|---|
| Inception V4 (IN) [50] | 80.1 | 183.7 | 20 | 190/210/250 |
| MnasNet with pw = 1.0 (mn-1.0) [51] | 74.1 | 321.9 | 20 | 85/100/130 |
| MnasNet with pw = 1.3 (mn-1.3) [51] | 75.2 | 511.6 | 20 | 105/120/150 |
| MobileNet V2 with pw = 1.3 (MO-1.3) [43] | 74.4 | 187.8 | 18 | 75/90/120 |
| MobileNet V2 with pw = 1.4 (MO-1.4) [43] | 75.0 | 214.7 | 18 | 85/100/130 |
| ResNet V2 (RN) [21] | 77.8 | 260.4 | 53 | 155/170/200 |
| VGG (VGG) [45] | 71.5 | 407.4 | 16 | 135/150/180 |

Table 5 below shows the model slicing information and execution plan calculated during the verification process. It is information generated under the condition of using the optimal energy in the time limit condition. B represents the big core, L represents the little core, G represents the GPU, and N represents the NPU. In Table 5, a number represents a layer index at which the corresponding slice starts and a frequency in the corresponding computing device.

TABLE 5

| Workload | Model slicing and execution plan |
|---|---|
| IN | $N_1^{960}, N_{11}^{960}, L_{20}^{1690},$ |
| MN-1.0 | $N_1^{960}, L_{14}^{1690}, N_{18}^{960}, L_{20}^{1402},$ |
| MN-1.3 | $N_1^{960}, B_9^{1210}, G_{12}^{332}, B_{14}^{1210}, G_{18}^{332}, B_{20}^{1210}$ |
| MO-1.3 | $N_1^{960}, G_8^{550}, L_{15}^{1402}, N_{18}^{960},$ |
| MO-1.4 | $N_1^{960}, G_9^{667}, L_{15}^{1690}, N_{18}^{960},$ |
| RN | $B_1^{1863}, N_2^{960}, L_4^{1690}, N_5^{960}, B_{12}^{1364}, N_{13}^{960}, N_{30}^{960}, B_{48}^{1364}, N_{49}^{960}, B_{53}^{1863},$ |
| VGG | $N_1^{960}, G_{14}^{332}, G_{15}^{237}, B_{16}^{682},$ |

Figure 5:
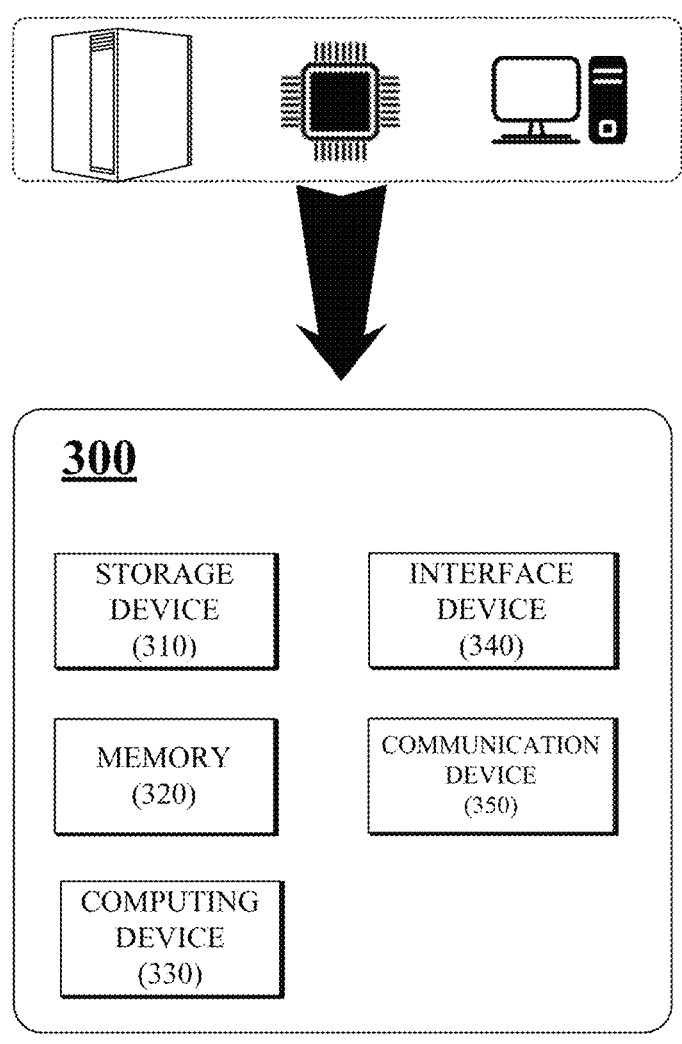
FIG. 5 is an example of a model slicing apparatus for slicing a deep learning model to be applied to a heterogeneous embedded system.

FIG. 5 is an example of a model slicing apparatus 300 for slicing a deep learning model to be applied to a heterogeneous embedded system. The model slicing apparatus 300 is an apparatus corresponding to the computer device 110 or 130 of FIG. 1. The model slicing apparatus 300 may be physically implemented in various forms. For example, the model slicing apparatus 300 may have the form of a computer device such as a PC, a smart device, a server of a network, a chipset dedicated to data processing, and the like.

The model slicing apparatus 300 may include a storage device 310, a memory 320, a computing device 330, an interface device 340, and a communication device 350.

The storage device 310 may store the information on the deep learning model operating in the heterogeneous embedded system. The heterogeneous embedded system includes a plurality of computing devices. The information on the deep learning model may include layers constituting the deep learning model and layer execution information of each of the plurality of computing devices. The layer execution information includes execution time and power consumption of a specific layer. The layer execution information includes execution time and power consumption for all possible combinations of {computing device, layer}. When there are three computing devices and three layers of the deep learning model, the layer execution information includes the execution time and power consumption for nine sets.

The storage device 310 may store deep learning model slicing software (program) described with reference to FIG. 3.

The storage device 310 may store a reinforcement learning model for slicing a layer.

The storage device 310 may store programs, source code, or the like required for data processing.

The memory 320 may store data and information generated while the model slicing apparatus 300 slices the layers of a deep learning model.

The interface device 340 is a device that receives predetermined commands and data from the outside. The interface device 340 is meant to include a hardware interface (data input/output device, bus, etc.) and a software interface. The interface device 340 may receive a deep learning model to be analyzed. The interface device 340 may receive information (computing power) on computing devices of a heterogeneous embedded system. The interface device 340 may receive a size of an input tensor and a size of an output tensor for each of the plurality of layers of the deep learning model. Alternatively, the interface device 340 may receive layer information and layer execution information necessary for slicing the deep learning model. The interface device 340 may transmit information (slice information) of allocating a layer to each computing device of the heterogeneous embedded system to the heterogeneous embedded system.

The communication device 350 has a configuration for receiving and transmitting predetermined information through a wired or wireless network. The communication device 350 may receive a deep learning model to be analyzed. The communication device 350 may receive the information (computing power) on the computing devices of the heterogeneous embedded system. The communication device 350 may receive the size of the input tensor and the size of the output tensor for each of the plurality of layers of the deep learning model. Alternatively, the communication device 350 may receive the layer information and the layer execution information necessary for slicing the deep learning model. The communication device 350 may transmit information (slice information) of allocating the layer to each computing device of the heterogeneous embedded system to the heterogeneous embedded system.

The interface device 340 may input the information and data received through the communication device 350.

The computing device 330 may slice the layers of the deep learning model to be analyzed using a deep learning model slicing program.

The computing device 330 may predict the execution time and power for each computing device of the heterogeneous embedded system for each layer of the deep learning model. The computing device 330 may predict the performance cost and power cost when each layer of the deep learning model is executed in each of the computing devices. The computing device 330 may calculate cost data (performance cost and power cost) for each layer by using the computing power of the computing device and the layer information of the deep learning model. The computing device 330 may predict the performance cost when each of the plurality of layers is executed at a specific frequency in each of the computing devices using a linear model for the execution time when the corresponding layer is executed in each of the computing devices of the heterogeneous embedded system.

The computing device 330 may predict the communication cost when transmitting information from each layer to the next layer for the layers of the deep learning model in each of the computing devices of the heterogeneous embedded system. The computing device 330 may predict the power cost when each of the plurality of layers is executed at a specific frequency in each of the computing devices based on power consumption when the corresponding layer is executed in each of the computing devices of the heterogeneous embedded system. The power cost may include the cost of electrostatic power, which is a unique characteristic of the computing device of the heterogeneous embedded system, and the cost of dynamic power when the computing device of the heterogeneous embedded system executes each of the plurality of layers at a voltage at a specific frequency.

The computing device 330 may predict the communication cost with a value proportional to the size of the input tensor and the size of the output tensor for each of the plurality of layers of the deep learning model.

The computing device 330 may slice (slice and allocate) the plurality of layers of the deep learning model so that different sliced layers are allocated to each of the computing devices based on the performance cost, the power cost, and the communication cost in a given execution time limit condition using the reinforcement learning model. The computing device 330 may generate information obtained by slicing the plurality of layers of the deep learning model. A detailed process of slicing the layers of the deep learning model is as described with reference to FIGS. 3 and 4.

The computing device 330 may be a device such as a processor, an application processor (AP), or a chip having a program embedded therein that processes data and processes a predetermined calculation.

In addition, the method of slicing deep learning model or the model inference method in the heterogeneous embedded system using the sliced model as described above may be implemented as a program (or application) including an executable algorithm that may be executed in a computer. The program may be stored and provided in a transitory or non-transitory computer readable medium.

The non-transitory computer-readable medium is a medium that semi-permanently stores data therein and is readable by an apparatus, rather than a medium that stores data therein for a short period of time, such as a register, a cache, a memory, or the like. Specifically, various applications or programs described above may be stored and provided in a non-transitory computer readable medium such as a compact disc (CD), a digital video disk (DVD), a hard disk, a Blu-ray disk, a universal serial bus (USB), a memory card, a read-only memory (ROM), a programmable read only memory (PROM), an erasable PROM (EPROM), an electrically EPROM (EEPROM), or a flash memory.

The transitory readable medium means various random access memories (RAMs) such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DRRAM).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of slicing a deep learning model for a heterogeneous embedded system in an inference process, the method comprising:

collecting, by a model slicing apparatus, execution time and power consumption for each layer of a deep learning model including a plurality of layers, when executed in each computing device of the heterogeneous embedded system;

predicting, by the model slicing apparatus, a performance cost and a power cost when each of the layers is executed in each of the computing devices using the execution time and the power consumption;

predicting, by the model slicing apparatus, a communication cost when transmitting information from each of the layers to a next layer in each of the computing devices; and slicing, by the model slicing apparatus, the plurality of layers so that different sliced layers are allocated to each of the computing devices based on the performance cost, the power cost, and the communication cost in a given execution time limit condition using a reinforcement learning model, wherein the reinforcement learning model calculates final state information having a maximum reward value while repeating a process in which an agent receives a state $s_t$ and a reward n and determines an action at in operation t, the state of the each layer comprises whether the each layer is a start layer of the sliced layers, any one computing device allocated for the each layer among the computing devices, and a frequency of the any one computing device, the reward has a higher value as the overall execution cost is lower when a time limit condition is satisfied, and the action includes change information for changing the state for each layer.

2. The method of claim 1, wherein, when any one of the computing devices supports dynamic voltage and frequency scaling (DVFS), the model slicing apparatus collects the execution time and the power consumption at each of a minimum frequency and a maximum frequency.

3. The method of claim 1, wherein the model slicing apparatus predicts the performance cost when each of the layers is executed at a specific frequency in each of the computing devices using a linear model for the execution time.

4. The method of claim 1, wherein the model slicing apparatus predicts the power cost when each of the layers is executed at a specific frequency in each of the computing devices based on the power consumption, and wherein the power cost includes a cost of static power, which is a unique characteristic of the computing device, and a cost of dynamic power when the computing device executes each of the layers at a voltage corresponding the specific frequency.

5. The method of claim 1, wherein the model slicing apparatus further collects a size of an input tensor and a size of an output tensor for each of the layers, and predicts the communication cost with a value proportional to the size of the input tensor and the size of the output tensor for each of the layers.

6. The method of claim 1, wherein the change information is any one of creating a new slice from a current layer, merging a slice to which the current layer belongs and a previous slice, changing the computing device executing the current layer, increasing a frequency by one level in the computing device executing the current layer, or decreasing a frequency by one level in the computing device executing the current layer.

7. An inference method based on a sliced deep learning model in a heterogeneous embedded system, the inference method comprising:

receiving, by the heterogeneous embedded system, information obtained by slicing a deep learning model according to the method of any one of claim 1; and determining, by the heterogeneous embedded system, slices and a computing device executing each of the slices among the computing devices based on the sliced information to infer the deep learning model, wherein the slice is a unit allocated by slicing the plurality of layers constituting the deep learning model to execute the sliced layers in one computing device.

8. An apparatus for slicing a deep learning model for a heterogeneous embedded system, the apparatus comprising:

an interface device configured to receive information regarding a deep learning model including a plurality of layers;

a storage device configured to store a reinforcement learning model for slicing and allocating the deep learning model in the heterogeneous embedded system; and a computing device configured to predict a performance cost and a power cost for each layer of the plurality of layers, when executed in each computing device of the heterogeneous embedded system, predict a communication cost when transmitting information from any one of the plurality of layers to a next layer in each of the computing devices, and slice and allocate the plurality of layers so that different sliced layers are allocated to each of the computing devices based on the performance cost, the power cost, and the communication cost in a given execution time limit condition using the reinforcement learning model, wherein the reinforcement learning model calculates final state information having a maximum reward value while repeating a process in which an agent receives a state $s_t$ and a reward $r_t$ and determines an action at in operation t, the state of the each layer comprises whether the each layer is a start layer of the sliced layers, any one computing device allocated for the each layer among the computing devices, and a frequency of the any one computing device, the reward has a higher value as the overall execution cost is lower when a time limit condition is satisfied, and the action includes change information for changing the state for each layer.

9. The apparatus of claim 8, wherein the computing device predicts the performance cost when each of the plurality of layers is executed at a specific frequency in each of the computing devices using a linear model for an execution time when the corresponding layer is executed in each of the computing devices of the heterogeneous embedded system.

10. The apparatus of claim 8, wherein the computing device predicts the power cost when each of the plurality of layers is executed at a specific frequency in each of the computing devices based on power consumption when the corresponding layer is executed in each of the computing devices of the heterogeneous embedded system, and the power cost includes a cost of static power, which is a unique characteristic of the computing device, and a cost of dynamic power when the computing device executes each of the plurality of layers at a voltage at the specific frequency.

11. The apparatus of claim 8, wherein the computing device further collects a size of an input tensor and a size of an output tensor for each of the plurality of layers, and predicts the communication cost with a value proportional to the size of the input tensor and the size of the output tensor for each of the plurality of layers.

12. The apparatus of claim 8, wherein the change information comprises any one of creating a new slice from a current layer, merging a slice to which the current layer belongs and a previous slice, changing the computing device executing the current layer, increasing a frequency by one level in the computing device executing the current layer, or decreasing a frequency by one level in the computing device executing the current layer.

\* \* \* \* \*